(12) United States Patent
Polson

(10) Patent No.: US 11,099,721 B2
(45) Date of Patent: Aug. 24, 2021

(54) IN-CELL COMMANDS FOR MATRIX LAYOUT STRUCTURED USER INTERFACE

(71) Applicant: Tiller LLC, Seattle, WA (US)

(72) Inventor: Peter Polson, Seattle, WA (US)

(73) Assignee: Tiller LLC, Seattle, WA (US)

( * ) Notice: Subject to any disclaimer, the term of this patent is extended or adjusted under 35 U.S.C. 154(b) by 0 days.

(21) Appl. No.: 16/374,539

(22) Filed: Apr. 3, 2019

(65) Prior Publication Data

US 2019/0302976 A1 Oct. 3, 2019

Related U.S. Application Data

(60) Provisional application No. 62/651,996, filed on Apr. 3, 2018.

(51) Int. Cl.
*G06F 3/0481* (2013.01)
*G06F 3/0484* (2013.01)
*G06F 16/22* (2019.01)
*G06F 40/18* (2020.01)

(52) U.S. Cl.
CPC ........ *G06F 3/0484* (2013.01); *G06F 16/2272* (2019.01); *G06F 40/18* (2020.01)

(58) Field of Classification Search
CPC ..... G06F 3/0484; G06F 16/2272; G06F 40/18
USPC ........................................................ 715/212
See application file for complete search history.

(56) References Cited

U.S. PATENT DOCUMENTS

| 9,805,015 | B2 * | 10/2017 | Singh ...................... G06F 16/26 |
| 9,910,843 | B2 * | 3/2018 | Thomas .................. G06F 40/18 |
| 10,282,407 | B1 * | 5/2019 | Lee .......................... G06F 40/18 |
| 2004/0054585 | A1 * | 3/2004 | Baratz ................ G06Q 30/0207 705/14.1 |
| 2009/0319542 | A1 * | 12/2009 | Le Brazidec ........... G06F 40/18 |
| 2013/0117648 | A1 * | 5/2013 | Boutin .................... G06F 40/18 715/212 |

* cited by examiner

*Primary Examiner* — Namitha Pillai
(74) *Attorney, Agent, or Firm* — Rowan TELS LLC

(57) ABSTRACT

A method of operating a structured user interface control logic through structured user interface (SUI) involves displaying the SUI with a matrix user interface with columns and rows and a column of empty command cells through a display device, and operating the control logic to interpret a user command input and cell position within the matrix user interface as a machine executable instruction set.

9 Claims, 11 Drawing Sheets

| $f_x$ | | | | | |
|---|---|---|---|---|---|
| CATEGORY | ACTUALS | BUDGETED | REMAINING | NEW BUDGET | PRIOR PERIOD |
| EXPENSE | $6,545 | $4,846 | -$1,633 | | $5,229 |
| BILLS | $333 | $339 | $6 | | $611 |
| PHONE | $154 | $154 | $0 | 170 | $291 |
| UTILITIES | $179 | $185 | $6 | | $320 |

FIRST SHEET 502

BUDGET / TRANSACTIONS / BALANCE HISTORY / CATEGORIES / CATEGORY HISTORY

| CATEGORY | BUDGET, 12/2017 | BUDGET 1/2018 | BUDGET 2/2018 | CARRYOVER 1/2018 |
|---|---|---|---|---|
| PHONE | $291.00 | $154.00 | $135.00 | $0.00 |
| UTILITIES | $320.00 | $185.00 | $150.00 | $0.00 |
| EATING OUT | $220.00 | $220.00 | $220.00 | $0.00 |
| GEAR & CLOTHING | $250.00 | $250.00 | $250.00 | $0.00 |

Tabs: BUDGET | TRANSACTIONS | BALANCE HISTORY | CATEGORIES | CATEGORY HISTORY

SECOND SHEET 602

FIG. 6

| CATEGORY | ACTUALS | BUDGETED | REMAINING | NEW BUDGET | PRIOR PERIOD |
|---|---|---|---|---|---|
| EXPENSE | $6,545 | $4,862 | -$1,617 | | $5,229 |
| BILLS | $333 | $355 | $22 | | $611 |
| PHONE | $154 | $170 | $16 | | $291 |
| UTILITIES | $179 | $185 | $6 | | $320 |

FIRST SHEET 502

FIG. 7

| CATEGORY | BUDGET, 12/2017 | BUDGET 1/2018 | BUDGET 2/2018 | CARRYOVER 1/2018 |
|---|---|---|---|---|
| PHONE | $291.00 | $170.00 | $135.00 | $0.00 |
| UTILITIES | $320.00 | $185.00 | EXPENSES: $4,862<br>BILLS: $355 | $0.00 |
| EATING OUT | $220.00 | $220.00 | $220.00 | $0.00 |
| GEAR & CLOTHING | $250.00 | $250.00 | $250.00 | $0.00 |

SECOND SHEET 602

FIG. 8

| DATE | DESCRIPTION | CATAGORY | COMMAND | AMOUNT |
|---|---|---|---|---|
| 2/5/2018 | AMAZON.COM | ▷ | S | -$65.03 |
| 2/5/2018 | EL FARO DE CADIZ | ▷ | | -$153.27 |
| 2/5/2018 | TEACHERSPAY.COM | ▷ | | -$1.25 |
| 2/5/2018 | TORCH COFFEE ROASTERS | ▷ | | -$29.24 |

BUDGET | TRANSACTIONS | BALANCE HISTORY | CATEGORIES | CATEGORY HISTORY

SECOND SHEET 602

FIG. 9

| DATE | DESCRIPTION | CATAGORY | COMMAND | AMOUNT |
|---|---|---|---|---|
| 2/5/2018 | AMAZON.COM | ▷ | | -$65.03 |
| 2/5/2018 | AMAZON.COM | ▷ | | $0.00 |
| 2/5/2018 | EL FARO DE CADIZ | ▷ | | -$153.27 |
| 2/5/2018 | TEACHERSPAY.COM | ▷ | | -$1.25 |

BUDGET | TRANSACTIONS | BALANCE HISTORY | CATEGORIES | CATEGORY HISTORY

SECOND SHEET 602

FIG. 10

IN-CELL COMMANDS FOR MATRIX LAYOUT STRUCTURED USER INTERFACE

CROSS-REFERENCE TO RELATED APPLICATIONS

This application claims the benefit of U.S. Provisional Application U.S. 62/651,996, filed Apr. 3, 2018, the contents of which are incorporated herein by reference in their entirety.

BACKGROUND

Managing complex matrix user interfaces for tasks such as budgeting can be very time consuming and may require users to work across various sheets and across different file menus and different modal toolboxes in order to adjust values correctly. Therefore, a need exists to manage matrix user interface values across different sources.

BRIEF SUMMARY

A method of operating a structured user interface control logic through a structured user interface (SUI) may involve displaying the SUI with a matrix user interface comprising data values in a plurality of cells organized into columns and rows, with a column of empty command cells associated with the control logic through a display device; receiving and displaying a user command input in an empty command cell through operation of a user interface controller; operating the control logic; displaying the modified values in corresponding cells within the matrix user interface as controlled by the machine executable instruction set; and clearing the user command input from the empty command cell. The operation of the control logic may include interpreting the user command input and cell position within the matrix user interface as a machine executable instruction set through operation of a machine command interpreter; identifying first data and second data based on the cell position and machine executable instruction set; generating modified values for the first data in at least one cell in the same row as the cell position of the user command input as controlled by the machine executable instruction set; generating the modified values for the second data in at least one cell in adjacent rows to the cell position of the user command input as controlled by the machine executable instruction set; and communicating the modified values and the machine executable instruction set to the user interface controller to cause display of the modified values as determined by the machine executable instruction set.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a matrix user interface 500 in accordance with one embodiment.

FIG. 6 illustrates a matrix user interface 600 in accordance with one embodiment.

FIG. 7 illustrates a matrix user interface 700 in accordance with one embodiment.

FIG. 8 illustrates a matrix user interface 800 in accordance with one embodiment.

FIG. 9 illustrates a matrix user interface 900 in accordance with one embodiment.

FIG. 10 illustrates a matrix user interface 1000 in accordance with one embodiment.

DETAILED DESCRIPTION

Figure 1:
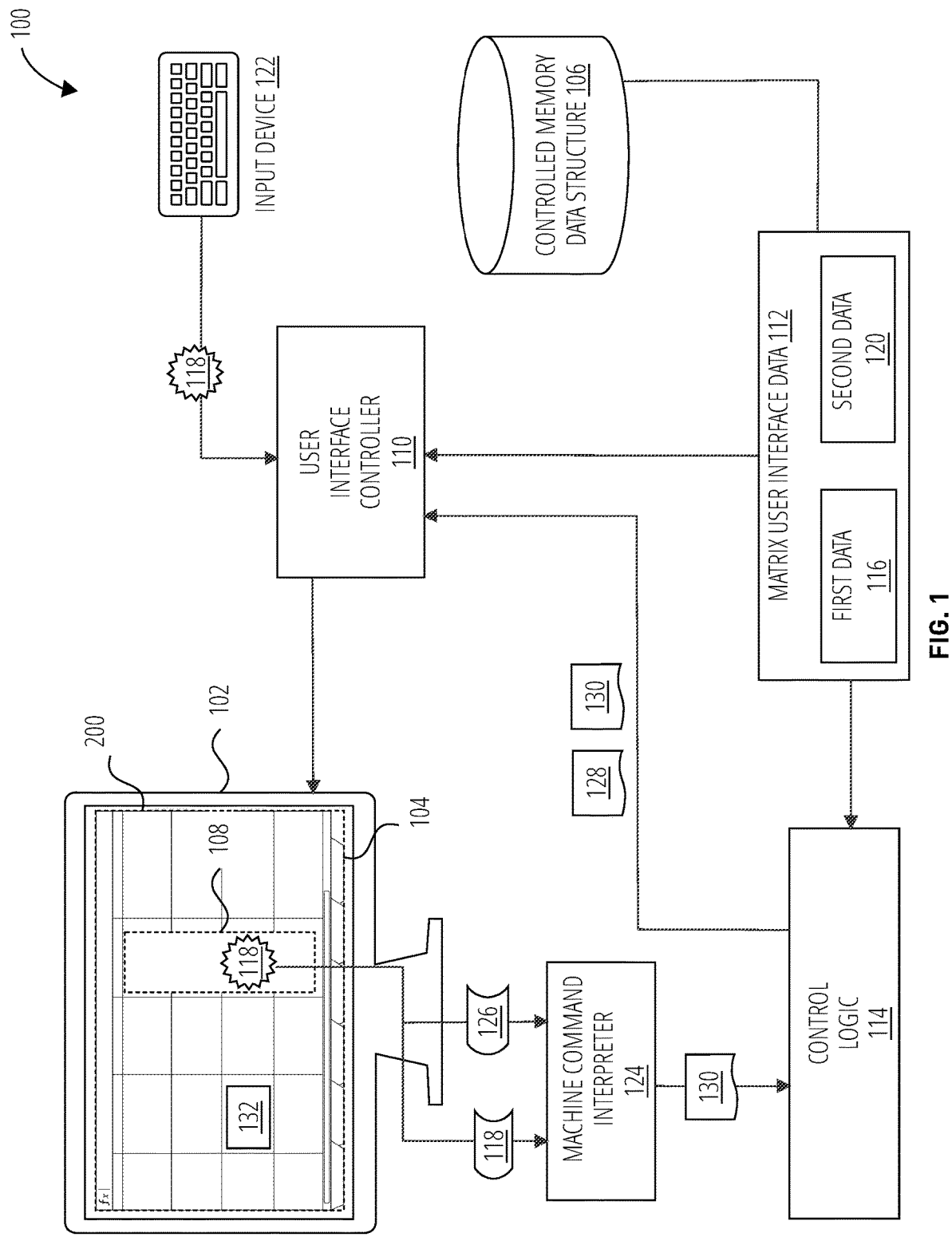
FIG. 1 illustrates a system 100 in accordance with one embodiment.

"User interface controller" refers to logic to control the behavior and appearance of a structured user interface.

"Machine command interpreter" refers to logic configured to parse and interpret a machine command into more atomic machine commands for execution by a machine processor.

"Cell position" refers to a grid location in a structured user interface identifiable by associated coordinates in two or more dimensions.

"Context-relevant dialog box" refers to a user interface element comprising data specifically tailored and relevant to a user input in another area of a structured user interface.

"User command input" refers to user commands entered via peripheral devices of a machine.

"Structured user interface" refers to a specific, structured graphical user interface paired with a prescribed functionality directly related to the user interface's structure that is addressed to and resolves a specifically identified problem in the prior state of the art.

"Sheet" refers to a subset of a matrix user interface that may be brought to the fore of a display and manipulated independently from other sheets, for example via selection of a tab user interface element for the sheet.

Disclosed herein are embodiments of a specific, structured user interface paired with a prescribed functionality directly related to the user interface's structure that is addressed to and resolves the specifically identified problems identified above in the prior state of the art (improving user productivity by reducing the user input and navigation required to perform complex actions in matrix-style user interfaces such as spreadsheets, for example).

A method of operating a structured user interface control logic through a structured user interface (SUI) may provide a new matrix user interface workflow to improve productivity by enabling users to trigger complex, script based, actions modified by intuitively associated data directly from in-cell inputs and shortcuts. Users may enable command shortcuts via cell ranges that are deliberately kept blank to form a user input surface. The control logic may comprise event driven triggers that perform script actions when data is written into a cell, such that the custom scripts trigger on data entry. The control logic may interpret the spatial positioning of the command as an input, allowing the scripts to pull data from other relevant fields in nearby and related cells. Additionally, the control logic may allow scripts to execute on the targeted cells, and may then clear the input cell where the command was entered.

For example, in a budget matrix user interface, the structured user interface control logic may allow for displayed budget values to be driven by formulas and may allow users to update the budget data source within their current working matrix user interface. A user may be able to make changes by entering a command in command cells and adjusting the values of various nearby cells. The user may be able to review and modify charges such as changing values.

The commands may also allow the users to perform more complex modification through the use of modifiers. For example, by adding a plus or minus before the value instead of writing an absolute value, the user may add a relative budget, allowing the user to enter a new value such that the budget changes. The users may also use prefixes; for instance, the command C+10 may increase an accrued savings value related to the budget values. The commands may also allow users to perform more complex actions, such as splitting a single entry into various entries through a prefix command that allows the user to split the cost of a transaction. Some of the sample commands may include "cc (categoryName)," which creates and applies a new category description to the current row; "s," which splits the current transaction; "s_(n)," which splits the current transaction and assigns a value of (n) to the new row; and "s(n)," which splits the current transaction by the amount of the integer such that it adds the (n−1) new rows.

A method of operating structured user interface control logic through an SUI may involve displaying the SUI with a matrix user interface comprising data values in a plurality of cells organized into columns and rows and a column of empty command cells associated with the control logic through a display device, receiving and displaying a user command input in an empty command cell through operation of a user interface controller, operating the control logic, displaying the modified values in corresponding cells within the matrix user interface as controlled by the machine executable instruction set, and clearing the user command input from the empty command cell. The operation of the control logic may include interpreting the user command input and cell position within the matrix user interface as a machine executable instruction set through operation of a machine command interpreter, identifying first data and second data based on the cell position and machine executable instruction set, generating modified values for the first data in at least one cell in the same row as the cell position of the user command input as controlled by the machine executable instruction set, generating the modified values for the second data in at least one cell in adjacent rows to the cell position of the user command input as controlled by the machine executable instruction set, and communicating the modified values and the machine executable instruction set to the user interface controller to cause display of the modified values as determined by the machine executable instruction set.

The data values may be derived from other data values in a different sheet of the matrix user interface. The method of operating the control logic may involve generating new columns and rows based on the user command input and populating the new columns and rows with new data values derived from the first data and second data.

In some embodiments, the method of operating the control logic may involve launching a context-relevant dialog box within the displayed sheet in response to a user command input and displaying the other data values from the different sheet for the data values in the row associated with the cell position of the user command input. For example, entering "z" in the command cell for an entry associated with the "Grocery" category may bring up a modal dialog box with line-item details for all transactions assigned to the "Grocery" category for the period.

In some embodiments, the method of operating the control logic may involve generating the second data from the modified values of the first data as controlled by the machine executable instruction set, generating at least one adjacent row to the row associated with the cell position of the user command input, and displaying the second data in at least one cell of the at least one adjacent row as controlled by the machine executable instruction set. For example, when a user enters a command to split the values in a current row, the second data may be generated from the value of the first data or the modified values of the first data.

Figure 2:
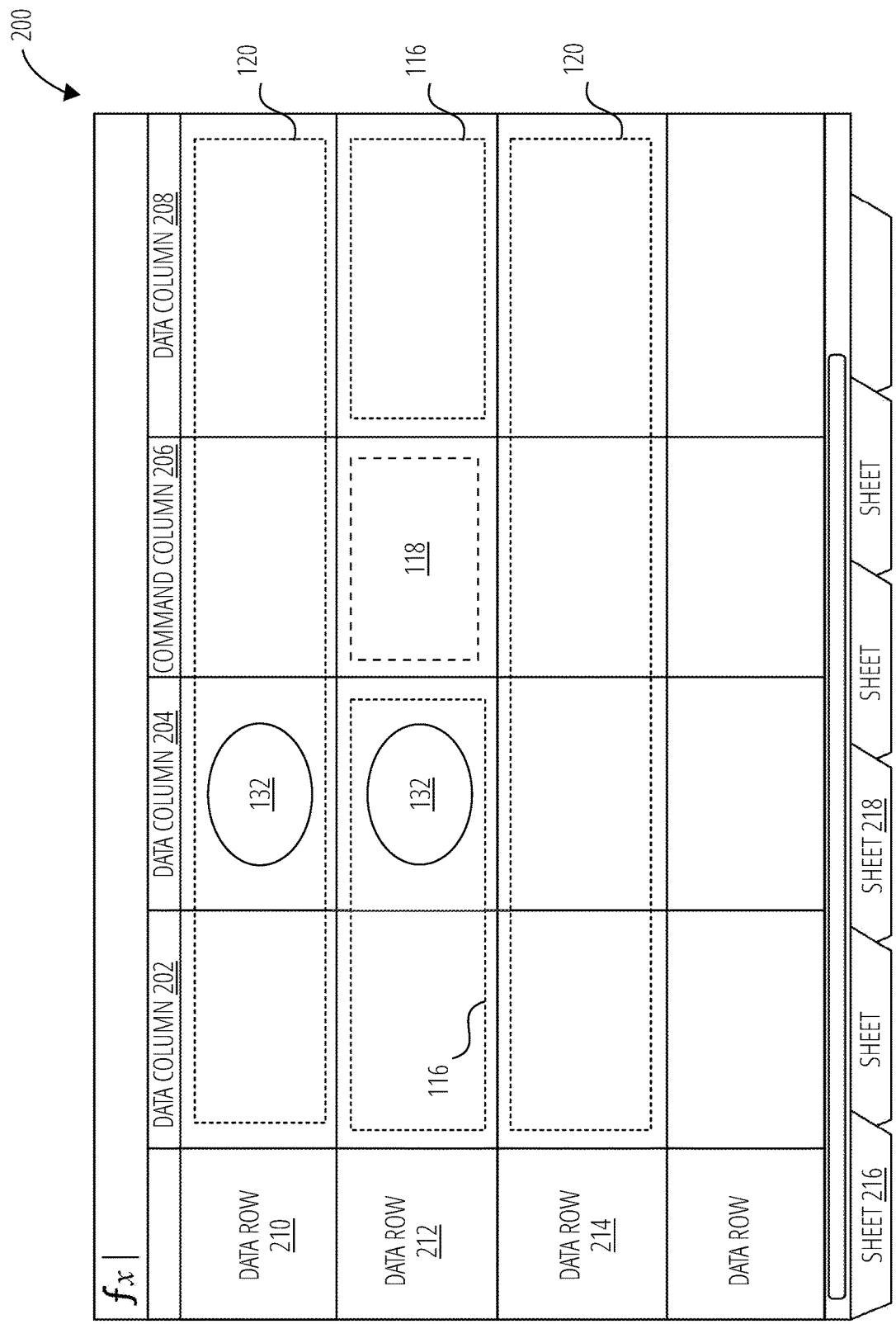
FIG. 2 illustrates a structured user interface 200 in accordance with one embodiment.

Referring to FIG. 1 and FIG. 2, a system 100 for operating a structured user interface control logic through a structured user interface (SUI) in accordance with one embodiment may include a display device 102, a structured user interface 104, a controlled memory data structure 106, a user interface controller 110, a machine command interpreter 124, and an input device 122. The display device 102 may display a matrix user interface 200 comprising matrix user interface data 112 stored in the controlled memory data structure 106 in the SUI. The matrix user interface 200 may include a column of empty command cells 108 associated with control logic 114 to modify data values within the matrix user interface 200.

The matrix user interface 200 displayed by the display device 102 in accordance with one embodiment may be displayed as part of a structured user interface 104, and may include a plurality of cells comprising columns and rows (i.e., first data column 202, second data column 204, third data column 208, first data row 210, second data row 212, and third data row 214), and a command column 206 comprising a column of empty command cells 108 as part of a first sheet 216. The column of empty command cells 108 may receive and temporarily display a user command input 118. The user command input 118 may be displayed in second data row 212. Data values from first data column 202, second data column 204, and third data column 208 that are in second data row 212 may be identified as first data 116, while data values for the same columns in first data row 210 and third data row 214 may be considered second data 120. The matrix user interface 200 may additionally include a second sheet 218 containing additional data values that may be utilized by the control logic 114 to generate the modified values.

During operation of the system 100, the user interface controller 110 may receive a user command input 118 from the input device 122 for an empty command cell within the matrix user interface 200. The user interface controller 110 may display the user command input 118 in one of the column of empty command cells 108 associated with the control logic 114. The user command input 118 may be detected by the control logic 114. The machine command interpreter 124 may interpret the user command input 118 and the cell position 126 to generate a machine executable instruction set 130. The control logic 114 may utilize the machine executable instruction set 130 to identify first data 116 and second data 120 in the matrix user interface data 112. The machine executable instruction set 130 may control the control logic 114 to generate modified values 128 from the first data 116 and the second data 120. The control logic 114 may communicate the modified values 128 and the machine executable instruction set 130 to the user interface controller 110. The user interface controller 110 may then display the modified values 132 in corresponding cells of the matrix user interface 200. The user interface controller 110 may clear the user command input 118 from the column of empty command cells 108, leaving them blank.

Figure 3:
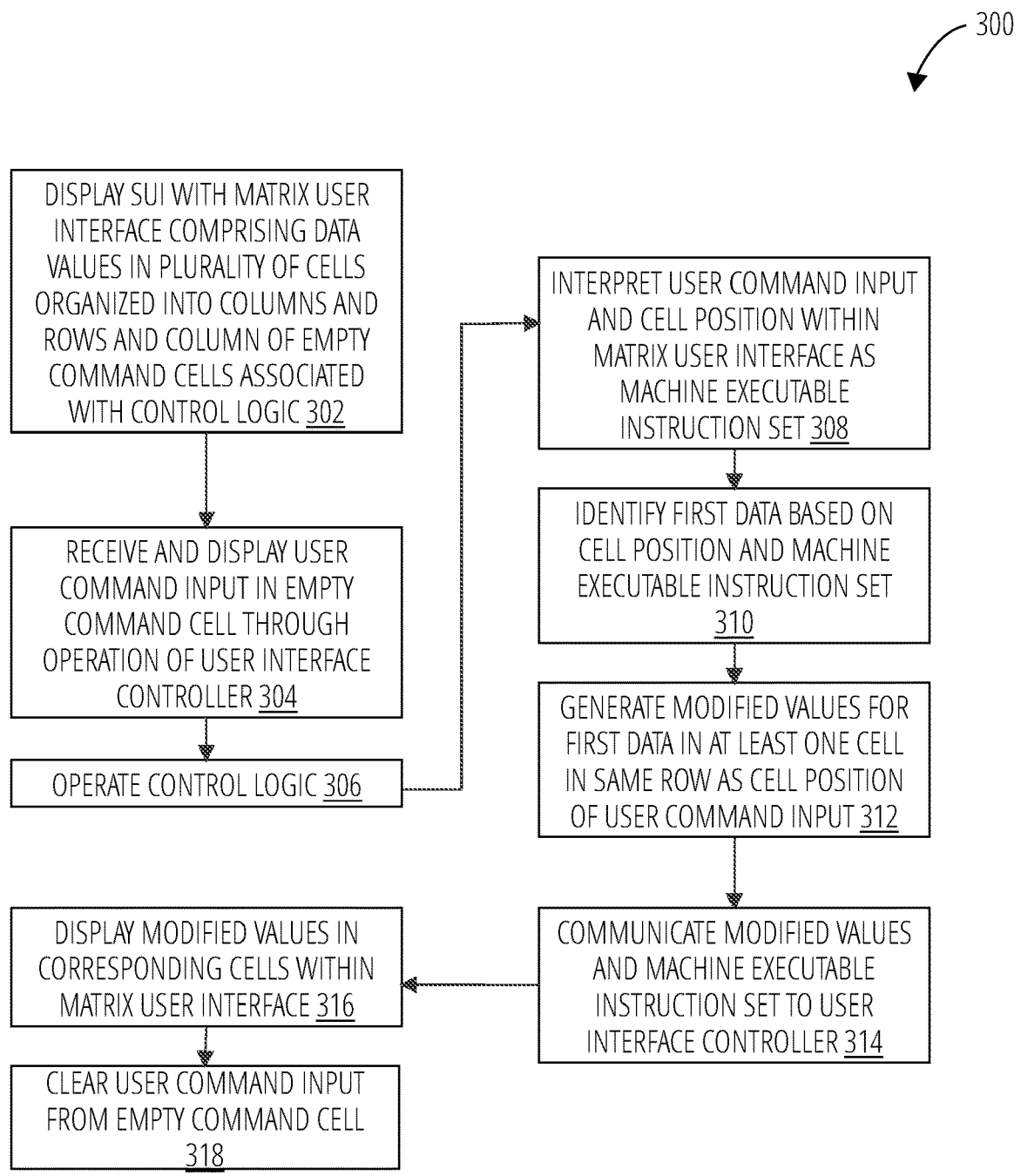
FIG. 3 illustrates a method 300 in accordance with one embodiment.

The system 100 may be operated in accordance with the process described in FIG. 3.

Referring to FIG. 3, a method 300 of operating a structured user interface control logic through SUI is shown in accordance with one embodiment. In block 302, the method 300 begins by displaying the SUI with a matrix user interface comprising data values in a plurality of cells organized into columns and rows and a column of empty command cells associated with the control logic through a display device. In block 304, the method 300 receives and displays a user command input in an empty command cell through operation of a user interface controller. In block 306, the method 300 operates the control logic.

In block 308, control logic interprets the user command input and cell position within the matrix user interface as a machine executable instruction set through operation of a machine command interpreter. In block 310, the control logic identifies first data based on the cell position and machine executable instruction set. In block 312, the control logic generates modified values for the first data in at least one cell in a same row as the cell position of the user command input as controlled by the machine executable instruction set. In block 314, the control logic communicates the modified values and the machine executable instruction set to the user interface controller.

In block 316, the method 300 displays the modified values in corresponding cells within the matrix user interface as controlled by the machine executable instruction set. In block 318, the method 300 clears the user command input from the empty command cell.

Figure 4:
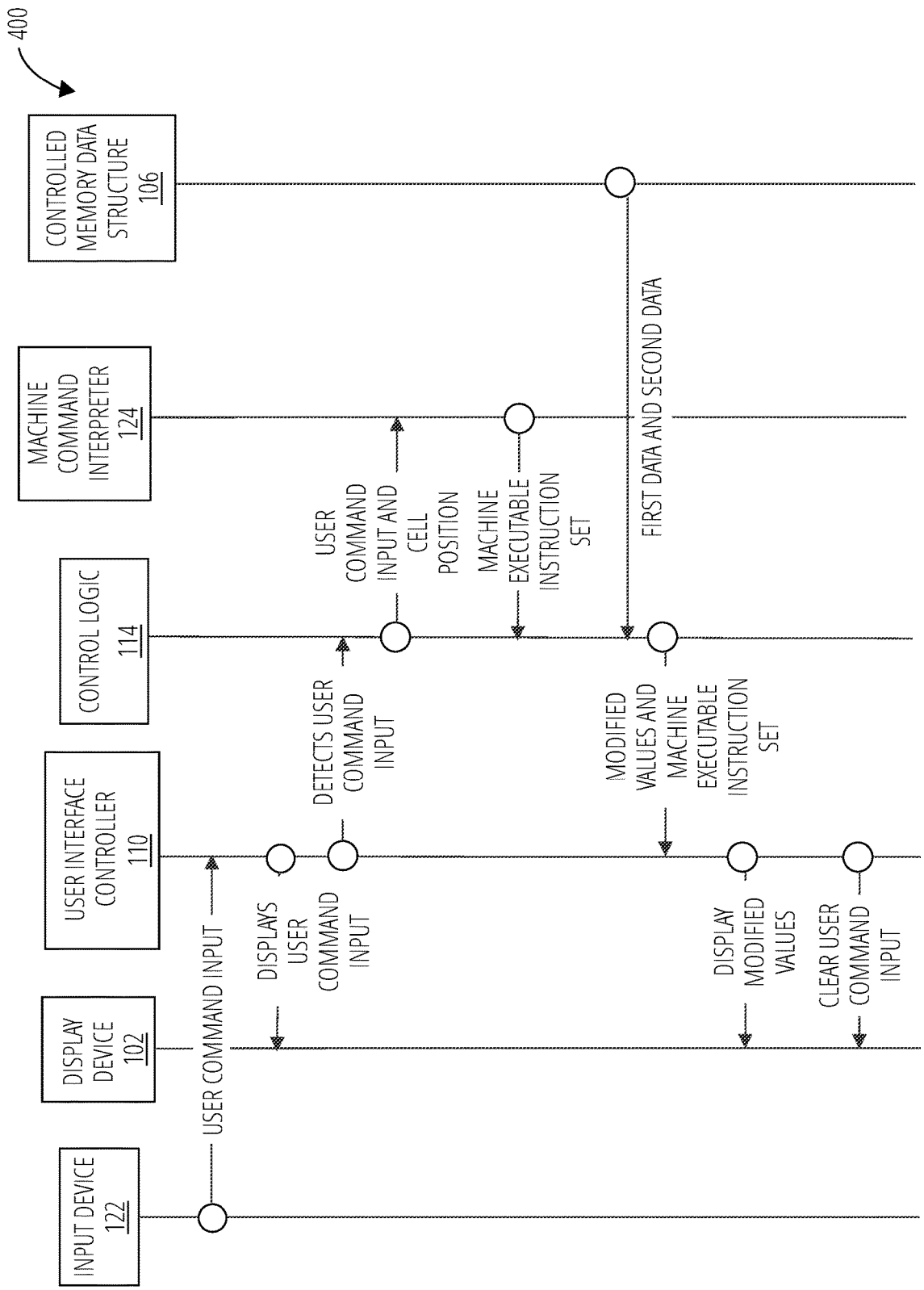
FIG. 4 illustrates a system interaction diagram 400 in accordance with one embodiment.

Referencing FIG. 4, a system interaction diagram 400 describes interactions between the input device 122, the display device 102, the user interface controller 110, the control logic 114, the machine command interpreter 124, and the controlled memory data structure 106, in accordance with one embodiment. The input device 122 may communicate a user command input to the user interface controller 110. Afterwards, the user interface controller 110 may communicate the user command input to the display device 102, and the display device 102 may display the command in the command cell of a matrix user interface. Simultaneously or immediately following, the control logic 114 may detect the user command input from the user interface controller 110, and may communicate the user command input and the cell position within the matrix user interface to the machine command interpreter 124.

The machine command interpreter 124 may generate a machine executable instruction set based on the user command input and cell position and may return the machine executable instruction set to the control logic 114. the controlled memory data structure 106 may provide first data and second data to the control logic 114. The control logic 114 may modify the values of first data and second data based on the machine executable instruction set and may return the modified values and machine executable instruction set to the user interface controller 110. The user interface controller 110 may direct the display device 102 to display the modified values and to clear the user command input.

Referencing FIG. 5 through FIG. 8, a matrix user interface 500 comprises a first sheet 502 and a second sheet 602 (shown as matrix user interface 600) in accordance with one embodiment. The second sheet 602 may comprise the raw data that is displayed in the first sheet 502. The first sheet 502 may include a command column 206 wherein a user may enter a user command input 118. The user command input 118 entered in the command column 206 may be a value of 170 as shown, which may correspond to a new budget entry.

The user command input 118 may affect the value of the first data 116 in a cell corresponding to the phone budget for the month of January. The value of the first data 116 may be derived from values in the second sheet 602. When the user command input 118 with the new value of 170 is entered, the value of the first data 116 (i.e., 154) from the first sheet 502 may be changed to 170, as shown on matrix user interface 700. This change may also be reflected in the raw data values in the second sheet 602, as shown on matrix user interface 800. The value of the second data 120 may also be modified as a result of the user command input 118. It may change from 339 to 355 as shown in matrix user interface 500 and matrix user interface 700, respectively. Additionally, after the control logic is finished running, the user command input 118 entered by the user may be cleared out and left blank, as shown in matrix user interface 700.

Referencing FIG. 9 and FIG. 10, a matrix user interface 900 comprises a plurality of cells with data values organized in columns and rows, in accordance with one embodiment. The matrix user interface 900 may also include a command column 206 with empty command cells.

A user may enter a user command input 118 with a prefix 'S' followed by an integer value in one of the empty command cells. This prefix and the corresponding integer may be interpreted to signify that the user wishes to split the value of the first data 116 by a certain amount of times while keeping the relevant row information the same.

When the value is split, as shown in matrix user interface 1000, the modified values 132 may retain the value of the first data 116 in the original row, but a new row matching the affected row may be created having a modified value of zero in the same column as the first data 116.

The user may enter a value for the zeroed out value, at which point the first data 116 may be modified to reflect the difference. For example, a user may enter a value of −$20 in the zeroed row of matrix user interface 1000, which may result in the value of −$65.03 changing to −$45.03.

In some embodiments, a context-relevant dialog box 802 may be generated when the user updates a datum that will result in additional changes on another sheet. A context-relevant dialog box 802 may also be generated to display values in a row associated with the cell position, or other pertinent information, when the user enters a command or changes a cell value.

Figure 11:
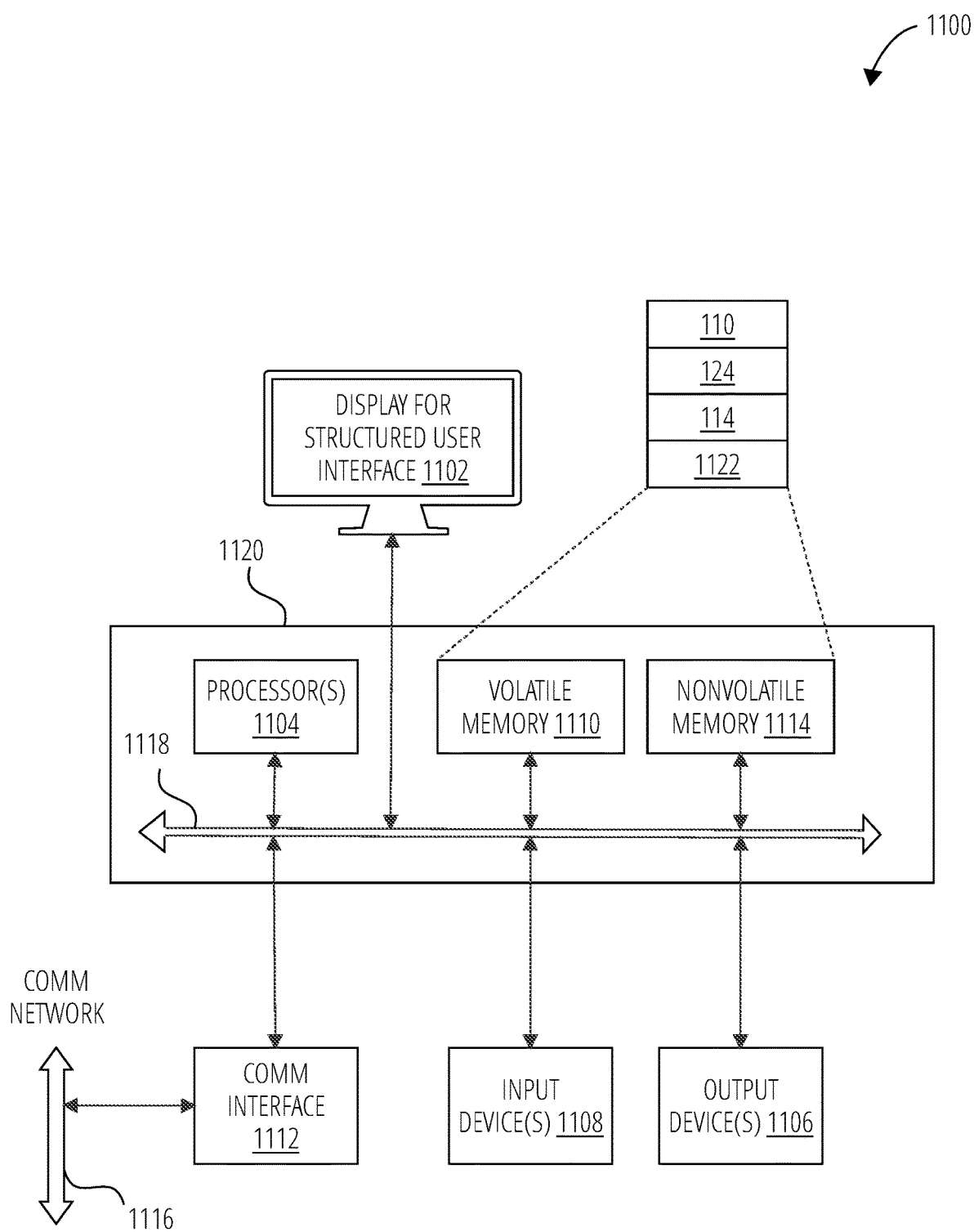
FIG. 11 illustrates a computing device 1100 in accordance with one embodiment.

FIG. 11 is an example block diagram of a computing device 1100 that may incorporate embodiments of the present invention. FIG. 11 is merely illustrative of a machine system to carry out aspects of the technical processes described herein, and does not limit the scope of the claims. One of ordinary skill in the art would recognize other variations, modifications, and alternatives. In one embodiment, the computing device 1100 typically includes a display device 1102, a data processing system 1120, a communication network interface 1112, input device(s) 1108, output device(s) 1106, and the like.

As depicted in FIG. 11, the data processing system 1120 may include one or more processor(s) 1104 that communicate with a number of peripheral devices via a bus subsystem 1118. These peripheral devices may include input device(s) 1108, output device(s) 1106, communication network interface 1112, and a storage subsystem, such as a volatile memory 1110 and a nonvolatile memory 1114.

The volatile memory 1110 and/or the nonvolatile memory 1114 may store computer-executable instructions and thus forming logic 1122 that when applied to and executed by the processor(s) 1104 implement embodiments of the processes disclosed herein.

The input device(s) 1108 include devices and mechanisms for inputting information to the data processing system 1120. These may include a keyboard, a keypad, a touch screen incorporated into the display device 1102, audio input devices such as voice recognition systems, microphones, and other types of input devices. In various embodiments, the input device(s) 1108 may be embodied as a computer mouse, a trackball, a track pad, a joystick, wireless remote, drawing tablet, voice command system, eye tracking system, and the like. The input device(s) 1108 typically allow a user to select objects, icons, control areas, text and the like that appear on the display device 1102 via a command such as a click of a button or the like.

The output device(s) 1106 include devices and mechanisms for outputting information from the data processing system 1120. These may include the display device 1102, speakers, printers, infrared LEDs, and so on as well understood in the art.

The communication network interface 1112 provides an interface to communication networks (e.g., communication network 1116) and devices external to the data processing system 1120. The communication network interface 1112 may serve as an interface for receiving data from and transmitting data to other systems. Embodiments of the communication network interface 1112 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 1112 may be coupled to the communication network 1116 via an antenna, a cable, or the like. In some embodiments, the communication network interface 1112 may be physically integrated on a circuit board of the data processing system 1120, or in some cases may be implemented in software or firmware, such as "soft modems", or the like.

The computing device 1100 may include logic that enables communications over a network using protocols such as HTTP, TCP/IP, RTP/RTSP, IPX, UDP and the like.

The volatile memory 1110 and the nonvolatile memory 1114 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1110 and the nonvolatile memory 1114 may be configured to store the basic programming and data constructs that provide the functionality of the disclosed processes and other embodiments thereof that fall within the scope of the present invention.

Logic 1122 that implements embodiments of the present invention may be stored in the volatile memory 1110 and/or the nonvolatile memory 1114. The logic 1122 may include the user interface controller 110, the machine command interpreter 124, and the control logic 114. Said logic 1122 may be read from the volatile memory 1110 and/or nonvolatile memory 1114 and executed by the processor(s) 1104. The volatile memory 1110 and the nonvolatile memory 1114 may also provide a repository for storing data used by the logic 1122.

The volatile memory 1110 and the nonvolatile memory 1114 may include a number of memories including a main random access memory (RAM) for storage of instructions and data during program execution and a read only memory (ROM) in which read-only non-transitory instructions are stored. The volatile memory 1110 and the nonvolatile memory 1114 may include a file storage subsystem providing persistent (non-volatile) storage for program and data files. The volatile memory 1110 and the nonvolatile memory 1114 may include removable storage systems, such as removable flash memory.

The bus subsystem 1118 provides a mechanism for enabling the various components and subsystems of data processing system 1120 communicate with each other as intended. Although the communication network interface 1112 is depicted schematically as a single bus, some embodiments of the bus subsystem 1118 may utilize multiple distinct busses.

It will be readily apparent to one of ordinary skill in the art that the computing device 1100 may be a device such as a smartphone, a desktop computer, a laptop computer, a rack-mounted computer system, a computer server, or a tablet computer device. As commonly known in the art, the computing device 1100 may be implemented as a collection of multiple networked computing devices. Further, the computing device 1100 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

The methods of this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A method of operating structured user interface control logic through a structured user interface (SUI), the method comprising:
   displaying, on a display device, the SUI comprising data values in a plurality of cells organized into columns and rows and a column of empty command cells associated with the structured user interface control logic;
   receiving and displaying a user command input in an empty command cell of the column of empty command cells;
   operating a machine command interpreter on the user command input and a cell position of the user command input to identify a machine executable instruction set;
   identifying first data based on the cell position of the user command input and the machine executable instruction set;
   executing the machine executable instruction set to generate modified values for the first data in at least one cell in a row associated with the cell position of the user command input;
   communicating the modified values and the machine executable instruction set to a user interface controller to cause display of the modified values as determined by the machine executable instruction set;
   clearing the user command input from the cell position of the user command input without further user input;
   executing the machine executable instruction set to generate second data from the modified values of the first data;
   generating at least one adjacent row to the row associated with the cell position of the user command input; and
   displaying the second data in at least one cell of the at least one adjacent row as controlled by the machine executable instruction set.

2. The method of claim 1, wherein the data values are derived from other data values in a different sheet of the structured user interface from a sheet comprising the data values.

3. The method of claim 2 further comprising:
   launching a context-relevant dialog box; and
   displaying the other data values from the different sheet in the row associated with the cell position of the user command input.

4. The method of claim 1 further comprising:
   identifying second data based on the cell position and the machine executable instruction set;
   generating new columns and new rows based on the user command input;
   generating the modified values for the second data in the at least one cell in adjacent rows to the cell position of the user command input as controlled by the machine executable instruction set; and
   populating the new columns and the new rows with new data values derived from the first data and the second data.

5. A computing apparatus, the computing apparatus comprising:
a processor; and
a memory storing instructions that, when executed by the processor, configure the apparatus to:
display, on a display device, a structured user interface comprising data values in a plurality of cells organized into columns and rows and a column of empty command cells;
receive and display a user command input in an empty command cell of the column of empty command cells;
operate a machine command interpreter on the user command input and a cell position of the user command input to identify a machine executable instruction set;
identify first data based on the cell position of the user command input and the machine executable instruction set;
execute the machine executable instruction set to generate modified values for the first data in at least one cell in a row associated with the cell position of the user command input;
communicate the modified values and the machine executable instruction set to a user interface controller to cause display of the modified values as determined by the machine executable instruction set;
clear the user command input from the cell position of the user command input without further user input;
execute the machine executable instruction set to generate second data from the modified values of the first data;
generate at least one adjacent row to the row associated with the cell position of the user command input; and
display the second data in at least one cell of the at least one adjacent row as controlled by the machine executable instruction set.

6. The computing apparatus of claim 5, wherein the data values are derived from other data values in a different sheet of the structured user interface from a sheet comprising the data values.

7. The computing apparatus of claim 6 wherein the instructions further configure the apparatus to:
launch a context-relevant dialog box; and
display the other data values from the different sheet in the row associated with the cell position of the user command input.

8. The computing apparatus of claim 5 wherein the instructions further configure the apparatus to:
identify second data based on the cell position and the machine executable instruction set;
generate new columns and new rows based on the user command input;
generate the modified values for the second data in the at least one cell in adjacent rows to the cell position of the user command input as controlled by the machine executable instruction set; and
populate the new columns and the new rows with new data values derived from the first data and the second data.

9. A non-transitory machine memory storing instructions that, when applied to one or more processor of a computing device, configure the computing device to:
display, on a display device, a structured user interface comprising data values in a plurality of cells organized into columns and rows and a column of empty command cells;
receive and display a user command input in an empty command cell of the column of empty command cells;
operate a machine command interpreter on the user command input and a cell position of the user command input to identify a machine executable instruction set;
identify first data based on the cell position of the user command input and the machine executable instruction set;
execute the machine executable instruction set to generate modified values for the first data in at least one cell in a row associated with the cell position of the user command input;
communicate the modified values and the machine executable instruction set to a user interface controller to cause display of the modified values as determined by the machine executable instruction set;
clear the user command input from the cell position of the user command input without further user input;
execute the machine executable instruction set to generate second data from the modified values of the first data;
generate at least one adjacent row to the row associated with the cell position of the user command input; and
display the second data in at least one cell of the at least one adjacent row as controlled by the machine executable instruction set.

* * * * *